C. NIELSEN.
FARM GATE.
APPLICATION FILED NOV. 11, 1920.
1,425,411. Patented Aug. 8, 1922.
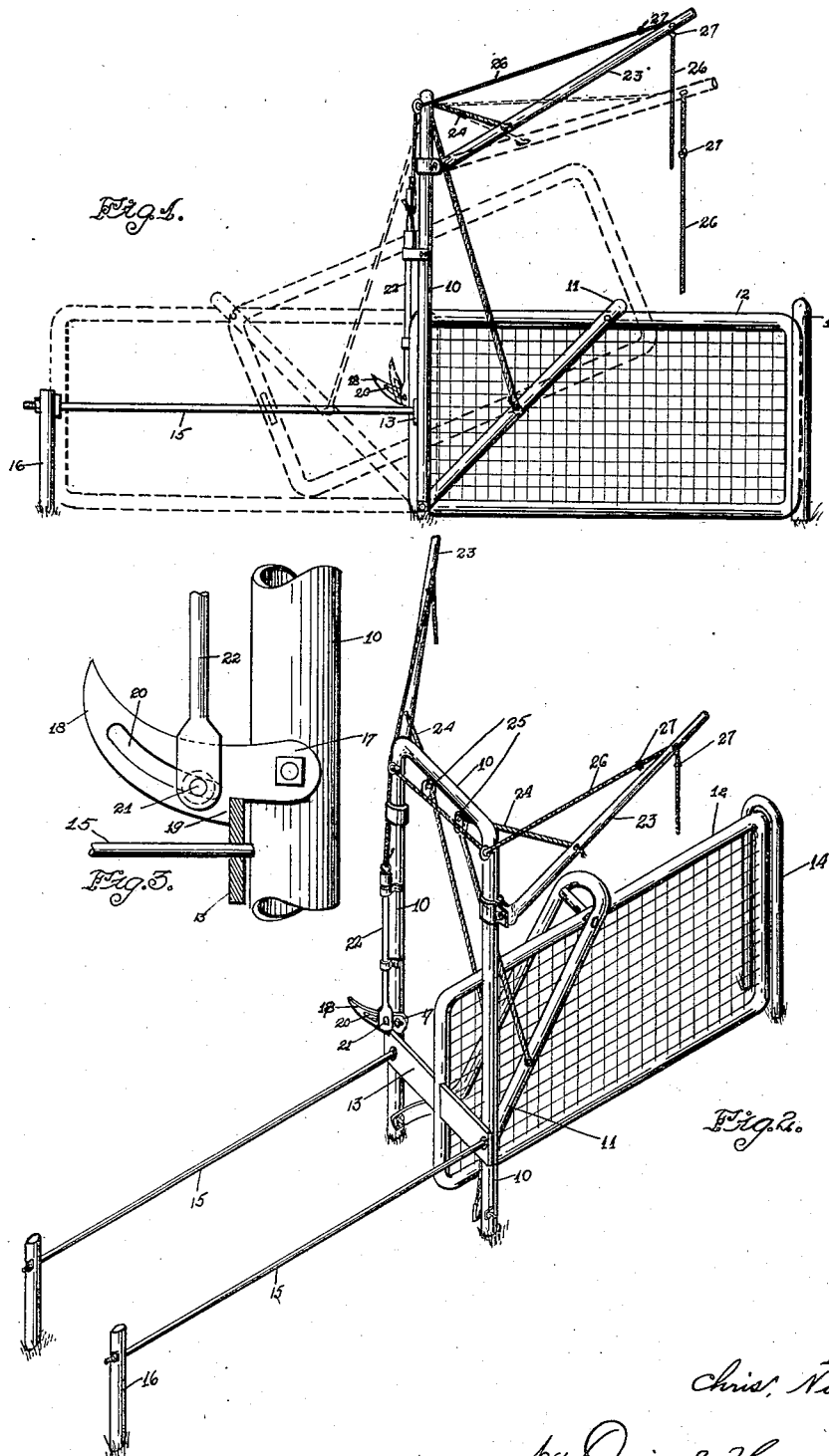

UNITED STATES PATENT OFFICE.

CHRIS NIELSEN, OF RUTHVEN, IOWA.

FARM GATE.

1,425,411. Specification of Letters Patent. Patented Aug. 8, 1922.

Application filed November 11, 1920. Serial No. 423,286.

*To all whom it may concern:*

Be it known that I, CHRIS NIELSEN, a citizen of the United States, and resident of Ruthven, in the county of Palo Alto and State of Iowa, have invented a certain new and useful Farm Gate, of which the following is a specification.

The object of my invention is to provide a gate of simple, durable and inexpensive construction, of the class in which the gate may be opened or closed by an operator in a vehicle or on foot, when approaching or leaving the gate by simply pulling upon the rope.

More specifically it is my object to provide a gate of this class in which one end of the gate is slidingly mounted for movement upon guide wires while the gate proper is open by tilting its other ends upwardly and then moving the entire gate longitudinally, thereby, providing a gate which is firmly and securely supported either when it is in its open or in its closed position, or when being moved.

A further object is, to provide an improved automatic latch device for the gate to co-act with a cross-piece of the gate that it is supported on guide wires, which latch device serves to aid in holding the gate firmly in position when closed and which is automatically released upon the initial movement of the gate controlling rope.

My invention consists in the construction, arrangement and combination of the various parts of the gate, whereby the objects contemplated are attained as hereinafter more fully set forth, pointed out in my claims and illustrated in the accompanying drawings, in which;

Figure 1 shows a side elevation of a gate embodying my invention. In this figure, the gate is shown in its closed position by solid lines, in partially open position by dotted lines, in a completely open position by dotted lines.

Figure 2 is a perspective view of the gate in a closed position and

Figure 3 shows an enlarged detail perspective view illustrating the parts of the latch device.

Referring to the accompanying drawings, I have used the reference numeral 10 to indicate generally the main supporting frame of the gate operating device. This is preferably made of pipe and comprises two uprights with their lower ends firmly placed in the ground and a connecting cross-piece at their upper ends. Pivotally connected with the lower ends of the uprights 10 is a lever 11, capable of swinging back and forth between the uprights 10. The gate proper, which may be of any ordinary construction, is indicated by the numeral 12 and is pivotally connected with the upper end of the lever 11. At one end of the gate 12 is a combined gate guide and latch device consisting of a cross-piece 13 rigidly secured to the gate 12 and provided at its ends with openings to receive guide wires, as hereinafter described.

At the outer end of the gate I have provided a stationary post 14, for the purpose only of preventing lateral movement of the outer end of the gate. For this purpose I preferably form this post of pipe and double it at its upper portion and its sides are spaced apart far enough to receive the end of the gate between them.

Fixed to the lower end portion of the uprights 10 and extending horizontally in a direction away from the gate opening are the guide wires 15, which pass through the openings in the combined guide and latch device 13, the outer end of the guide wires 15 being supported in the post 16.

Pivoted to one of the uprights 10 is a latch member 17, having a curved portion, a shoulder 19 and also provided with a curved slot 20. Slidingly mounted in the curved slot is a pin 21, attached to a slide bar 22, mounted on the adjacent upright 10.

Mounted upon the portion of each upright 10 is an adjustable bracket, to which is pivoted an arm 23, which arm extends outwardly and upwardly away from the gate. Connected with the central portion of the arm 23 is a rope 24, passed over a pulley 25, on the upright 10 and extended downward and attached to the lever 11. Slidingly mounted in the outer arm 23 is a rope 26, its movement in the arm 23 being limited by the stops 27 on the rope. The outer end of the rope is left hanging downward from the arm 23 to be grasped by the operator. These ropes 26, are connected to the side bar 22.

In practical use and assuming that the gate proper is in its closed position it is obvious that it will be firmly held in said position because the cross-piece 13 rests against one side of the frame 10. The outer end of the gate has its lateral movement prevented by the post 14 and the other end of the gate is held against movement by the latch 17 engaging the member 13, thus supporting the gate against movement in any direction and its accidental displacement. The operator in a vehicle approaching the gate may conveniently grasp and pull the rope 26. The first result of such movement is to lift the slide bar 22 and the latch device 17, then the next result is to lower the arm 23 and thus pull upon the rope 24. This oscillates the lever 11 and raises the outer end of the gate. The other end of the gate is guided to slide upon the guide wires 15 and after the gate has passed to the position shown by dotted lines at the central portion of Figure 1, it will continue to move by gravity to its wide open position. Attention is called to the fact that throughout the entire movement of the gate and when in its open position it will be guided and supported by the cross-piece 13 and the guide wires 15 against lateral or twisting strains, thus relieving all twisting strains from the point of connection between the lever 11 and the gate. Furthermore, when the gate is in its closed position it is firmly and immovably held against any strains to which it might be subjected. Its outer end cannot be elevated on account of the latch device.

It cannot move laterally on account of the post 14. However, when the latch is released, the outer end of the gate swings upward, thus permitting it to clear itself from snow or any other obstruction on the roadway. By providing an adjustable bracket and supporting the arms 23, the said arms may be extended to any angle or into any position most readily accessible to the operator. After the gate is opened, these arms 23, may readily and easily be swung up out of the way of a large or high load on a vehicle passing through the gate way. When the gate swings to a closed position the cross-piece 13 strikes the curved edge 18 of the latch so that the free end of the latch is elevated to permit the cross-piece 13 to pass back of the shoulder 19.

I claim as my invention

1. The combination with a gate, of an upright frame, a lever pivoted to the lower portion of the upright frame and also pivoted to the upper central portion of the gate, means for swinging the lever to move the gate longitudinally, a cross piece fixed to one end of the gate and having two openings therein, two wires fixed to the upright extended through said openings in substantially horizontal positions, supporting posts for the outer ends of said wires, said wires being extended in horizontal positions parallel with the opposite sides of the gate whereby when the said lever is moved one end of the gate will be tilted upwardly and the other end will be guided in substantially a horizontal position during its longitudinal movement.

2. The combination with a gate, of an upright frame, a cross-piece fixed to one end of the gate, guide wires parallel with the gate and extended through said cross-piece, a latch device supported on said upright frame and designed to co-operate with said cross-piece, a post at the outer end of the gate designed to engage its sides to thereby prevent lateral swinging movement, two adjustable brackets on the upright frame, and arm pivoted to each, a rope fixed to each arm, a pulley on the upright frame for each rope, a lever fulcrumed at its lower end to the upright frame and having the said ropes attached to it, a latch rope for each arm having a limited sliding movement relative thereto and connected to said latch device, substantially as and for the purpose stated.

Des Moines, Iowa, October 6, 1920.

CHRIS NIELSEN.